(12) United States Patent
Cheng et al.

(10) Patent No.: US 6,524,724 B1
(45) Date of Patent: Feb. 25, 2003

(54) CONTROL OF MAGNETIC FILM GRAIN STRUCTURE BY MODIFYING NI-P PLATING OF THE SUBSTRATE

(75) Inventors: Yuanda Randy Cheng, San Jose, CA (US); Connie Chunling Liu, San Jose, CA (US); Chung Shih, Cupertino, CA (US); Linda Lijun Zhong, Fremont, CA (US); Jeff Duane St. John, Los Gatos, CA (US); Jeffery Lee Petrehn, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 30 days.

(21) Appl. No.: 09/779,484

(22) Filed: Feb. 9, 2001

Related U.S. Application Data
(60) Provisional application No. 60/182,028, filed on Feb. 11, 2000.

(51) Int. Cl.$^7$ .............................. G11B 5/66; G11B 5/70; H01F 1/00; B05D 5/12
(52) U.S. Cl. ..................... 428/611; 428/336; 428/667; 428/694 TS; 428/900; 427/128; 427/129; 427/131
(58) Field of Search .......................... 428/694 TS, 336, 428/667, 900, 611; 427/128, 129, 131, 132, 299, 307

(56) References Cited

U.S. PATENT DOCUMENTS

| | | | |
|---|---|---|---|
| 4,810,592 A | 3/1989 | Miyabayashi | 428/668 |
| 4,950,548 A | 8/1990 | Furusawa et al. | 428/611 |
| 5,118,564 A | 6/1992 | Shinohara et al. | 428/336 |
| 5,143,794 A | 9/1992 | Suzuki et al. | 428/611 |
| 5,236,791 A | 8/1993 | Yahisa et al. | 428/694 TP |
| 5,307,223 A * | 4/1994 | Doerner et al. | 360/97.01 |
| 5,334,267 A | 8/1994 | Taniguchi et al. | 148/425 |
| 5,360,677 A | 11/1994 | Fukai et al. | 428/694 ST |
| 5,480,733 A * | 1/1996 | Okumura et al. | 428/694 T |
| 5,605,733 A | 2/1997 | Ishikawa et al. | 428/65.3 |
| 5,665,478 A | 9/1997 | Suzuki et al. | 428/611 |
| 5,681,635 A | 10/1997 | Nelson et al. | 428/65.3 |
| 5,736,235 A | 4/1998 | Matsuda et al. | 428/212 |
| 5,766,718 A | 6/1998 | Matsuda et al. | 428/65.3 |
| 5,815,343 A | 9/1998 | Ishikawa et al. | 360/97.01 |
| 6,057,021 A | 5/2000 | Ishikawa et al. | 428/65.3 |
| 6,071,607 A | 6/2000 | Okuyama et al. | 428/332 |
| 6,083,599 A | 7/2000 | Hirayama et al. | 428/65.3 |
| 6,183,893 B1 * | 2/2001 | Futamoto et al. | 428/694 TS |
| 2002/0009619 A1 * | 1/2002 | Sakawaki et al. | 428/694 TS |

* cited by examiner

Primary Examiner—Holly Rickman
(74) Attorney, Agent, or Firm—Morrison & Foerster LLP

(57) ABSTRACT

High areal density magnetic recording media exhibiting low noise are formed with a Ni—P—X plating layer, in which X is an additive meeting the following requirement: (1) The additive has a higher oxidation potential than that of Ni so that grains of an additive-rich-oxide will form first during oxidation under a controlled atmosphere and grains of a Ni-rich-oxide, if any, will form subsequently and separately from the grains of the additive-rich oxide. (2) The additive has a tendency to segregate to the top surface. (3) The additive is not a catalyst poison for Ni—P plating in the composition range.

15 Claims, 3 Drawing Sheets

PRIOR ART

US 6,524,724 B1

CONTROL OF MAGNETIC FILM GRAIN STRUCTURE BY MODIFYING NI-P PLATING OF THE SUBSTRATE

RELATED APPLICATIONS

This application claims priority from provisional No. 60/182,028 filed Feb. 11, 2000, entitled "Control Magnetic Film Grain Structure by Modifying Ni—P Plating of the Substrate," the entire disclosure of which is hereby incorporated herein by reference.

TECHNICAL FIELD

This invention relates to a magnetic medium, such as a thin film magnetic recording medium, and the method of manufacturing the medium. The invention has particular applicability to a magnetic recording medium exhibiting low noise, high coercivity and suitable for high-density longitudinal and perpendicular recording.

BACKGROUND ART

The requirements for high areal density impose increasingly greater requirements on magnetic recording media in terms of coercivity, remanent squareness, low medium noise and narrow track recording performance. It is extremely difficult to produce a magnetic recording medium satisfying such demanding requirements, particularly a high-density magnetic rigid disk medium for longitudinal and perpendicular recording. The magnetic anisotropy of longitudinal and perpendicular recording media makes the easily magnetized direction (the easy axis of magnetization) of the media located in the film plane and perpendicular to the film plane, respectively. The remanent magnetic moment of the magnetic media after magnetic recording or writing of longitudinal and perpendicular media is located in the film plane and perpendicular to the film plane, respectively.

To accommodate for increased areal density, design of magnetic media is one of the key factors. The main limitation in media is the so-called "superparamagnetic" effect, which can be interpreted simply as follows: to achieve high areal density media, the grain size of the magnetic film needs to be reduced. However, when grain size approaches 100 Å, the energy needed to switch the easy axis of magnetization of one grain to that of the other becomes smaller than the thermal energy if the grains are weakly coupled. That is, the thermal energy destroys the magnetism by randomizing the magnetization of the small grains, and the grains can not hold permanent magnetization any more. Therefore, it has become extremely important to make "thermally stable" magnetic films with grains smaller than 100 Å for high areal density applications.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material which comprise a mixture of amorphous and crystalline materials, and ceramic materials. Glass-ceramic materials do not normally exhibit a crystalline surface. Glasses and glass-ceramics generally exhibit high resistance to shocks.

A conventional longitudinal recording disk medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

Conventional methods for manufacturing longitudinal magnetic recording medium with a glass or glass-ceramic substrate comprise applying a seed layer between the substrate and underlayer. A conventional seed layer seeds the nucleation of a particular crystallographic texture of the underlayer.

Conventional Cr-alloy underlayers comprise vanadium (V), titanium (Ti), tungsten (W) or molybdenum (Mo). Other conventional magnetic layers are CoCrTa, CoCrPtB, CoCrPt, CoCrPtTaNb and CoNiCr.

A conventional longitudinal recording disk medium is prepared by depositing multiple layers of metal films to make a composite film. In sequential order, the multiple layer typically comprise a non-magnetic substrate, one or more underlayers, a magnetic layer, and a protective carbon layer. Generally, a polycrystalline epitaxially grown cobalt-chromium (CoCr) magnetic layer is deposited on a chromium or chromium-alloy underlayer.

The seed layer, underlayer, and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

The linear recording density could be increased by increasing the coercivity of the magnetic recording medium. However, this objective could only be accomplished by decreasing the medium noise, as by maintaining very fine magnetically noncoupled grains. As the recording areal density increases, conventional magnetoresistive (MR) disks have smaller grain size, which induces superparamagnetic limit and causes the collapse of medium coercivity and magnetic remanance. Also, conventional sputtered media rely on the magnetic alloy composition to increase volume anisotropy.

There exists a need for technology enabling the use of a structure that make "thermally stable" magnetic films with grains smaller than 100 Å for high areal density applications.

SUMMARY OF THE INVENTION

During the course of the present invention, it was found that modifying the substrate plating composition so that during sputtering, special film, such as oxide film, with uniform and extremely fine grains (<100 Å) can form on the top of the substrate surface. The subsequent growth of magnetic films will be pre-defined by the special oxide film. Uniform grains (<100 Å) of magnetic film could be formed on top of the oxide grains underneath, with narrow grain size distribution. Because of the narrow grain size distribution, one could eliminate magnetic grains which are too small to be thermally stable while maintaining the small mean grain size for good signal-to-noise performance. As a result, the "superparamagnetic" effect will be pushed further down to higher areal densities.

An embodiment of this invention is a magnetic recording medium, comprising a substrate, a Ni—P—X containing layer on the substrate and a magnetic layer with segregated Co-containing grains on the Ni—P—X containing layer, wherein X has a higher oxidation potential than that of Ni and X is not W. In other embodiments, X is selected from the group consisting of Al, Co, Cr, Fe, Ti, V, Cd, Zr, Mn and Mo. The magnetic recording medium could further comprise an underlayer comprising at least one layer of Cr or Cr-based alloy on the Ni—P—X containing layer and an optional intermediate layer comprising a CoCr-based alloy on the underlayer. The segregated Co-containing grains have a mean grain diameter of about 100 Å or less. The mean grain diameter could be measured by performing a grain size analysis of transmission electron microphotographs of the magnetic layer. The magnetic recording medium could comprise an oxide layer in between the Ni—P—X containing layer and the magnetic layer. The oxide layer could comprise additive-rich-oxide grains and Ni-rich oxide grains. The additive-rich-oxide grains could have a spacing between adjacent additive-rich-oxide grains of about 100 Å or less. The oxide layer could have a thickness of about 5 to 100 Å. The magnetic layer could have a thickness of about 100 to 300 Å. The substrate could be a glass substrate or an aluminum substrate, the underlayer could be CrW, CrV, CrTi or CrTa and the intermediate layer could be CoCr, CoCrPt, CoCrPtTa or CoCrPtB.

Another embodiment of this invention is a method of manufacturing a magnetic recording medium, the method comprising depositing a Ni—P—X containing layer on a substrate and depositing a magnetic layer on the Ni—P—X containing layer, wherein X has a higher oxidation potential than that of Ni and X is not W.

The method could further comprise depositing an oxide layer on the Ni—P—X containing layer, depositing an underlayer comprising at least one layer of Cr or Cr-based alloy on the oxide layer and depositing an optional intermediate layer comprising a CoCr-based alloy on the underlayer.

Another embodiment is a magnetic recording medium, comprising a substrate; a magnetic layer comprising segregated Co-containing grains and means for nucleating the segregated Co-containing grains of the magnetic layer on the substrate. The means for nucleating the segregated Co-containing grains could be the substrate or a film on the substrate, wherein the substrate and/or the film contains nucleation sites for the nucleation and growth of the segregated Co-containing grains of the magnetic layer. Preferably, the magnetic layer would inherit the structure of the film underneath containing the nucleation sites.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The drawings and description are to be regarded as illustrative in nature, and not as restrictive.

DESCRIPTION OF THE INVENTION

The present invention enables the manufacture of magnetic recording media comprising a magnetic layer having a narrow grain size distribution, thereby eliminating magnetic grains which are too small to be thermally stable while maintaining a small grain size for good signal-to-noise performance. This media is suitable for high density longitudinal and perpendicular magnetic recording.

The narrow grain size distribution of the grains of the magnetic layer is achieved by first plating a substrate with a Ni—P—X layer, wherein X is an additive that has a higher oxidation potential than that of Ni. Second, an oxide film with extreme fine grains is grown on the Ni—P—X layer under controlled atmosphere inside a sputter chamber. Because the additive has a higher oxidation potential then Ni, additive-rich oxide grains are formed at segregated sites near where the additive located on the surface of the Ni—P—X layer. Then, the magnetic layer is nucleated and grown on the oxide film such that the magnetic layer inherits the structure of the oxide film underneath the magnetic layer. The phrase "a magnetic layer comprising segregated Co-containing grains on the Ni—P—X layer" refers to a magnetic layer that is nucleated and grown such that the grains of the magnetic layer are formed at segregated sites near where the additive is located on the surface of the Ni—P—X layer.

The additive for the Ni—P—X layer should meet the following requirement: (1) The additive has a higher oxidation potential than that of Ni so that grains of an additive-rich-oxide will form first during oxidation under a controlled atmosphere and grains of a Ni-rich-oxide, if any, will form subsequently and separately from the grains of the additive-rich oxide. (2) The additive has a tendency to segregate to the top surface. (3) The additive is not a catalyst poison for Ni—P plating in the composition range.

Based on requirement (1) and (2), ions such as Al, Co, Cr, Fe, Ti, V, Cd, Zr, Mn and Mo could be added. The following Ni—P—X electroless systems are preferred: Ni—P—Re, Ni—P—Co, Ni—P—Fe, Ni—P—Cu, Ni—P—Mn, Ni—P—Cr, Ni—P—Mo, Ni—P—Sn, Ni—P—Sb, Ni—P—Cd.

Figure 1:
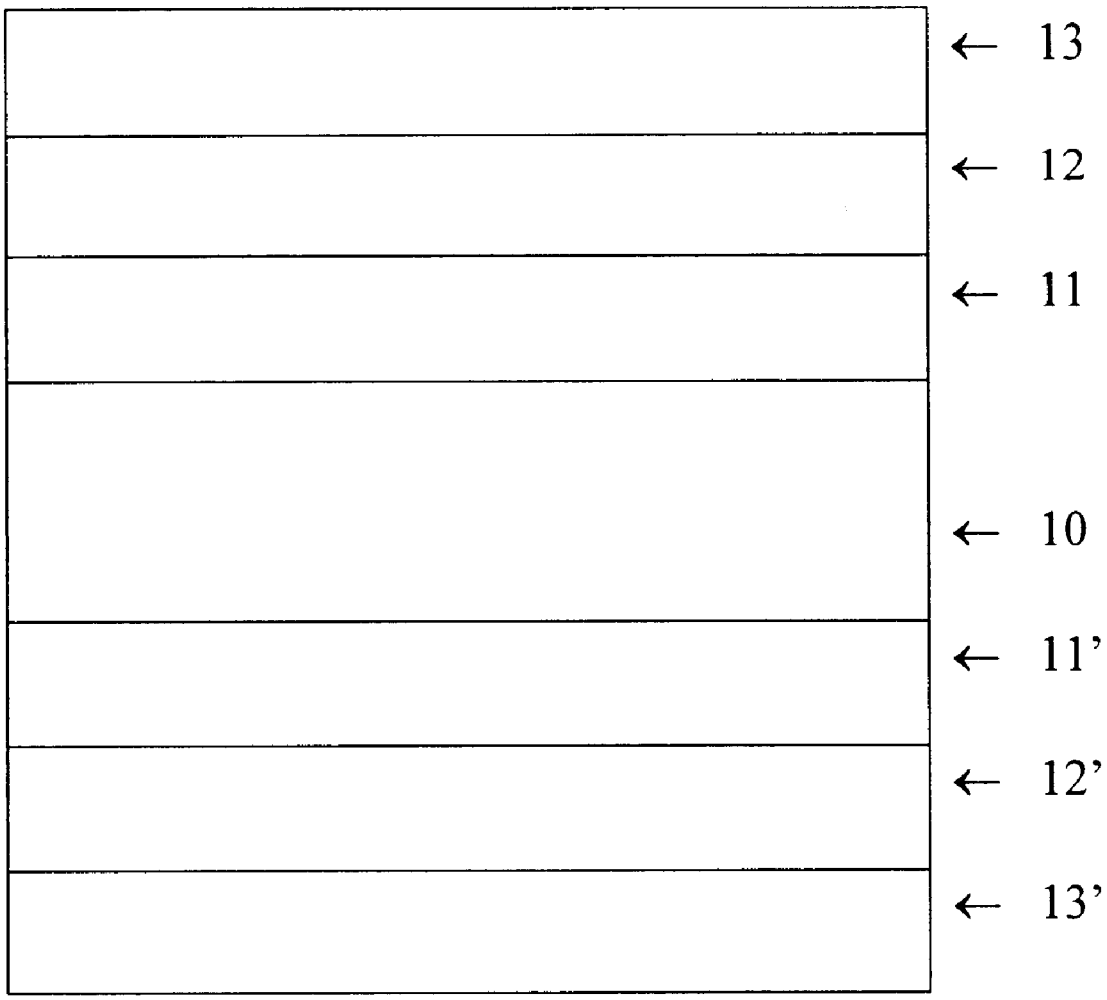
FIG. 1 schematically shows a conventional magnetic recording medium (Prior Art).
Figure 2:
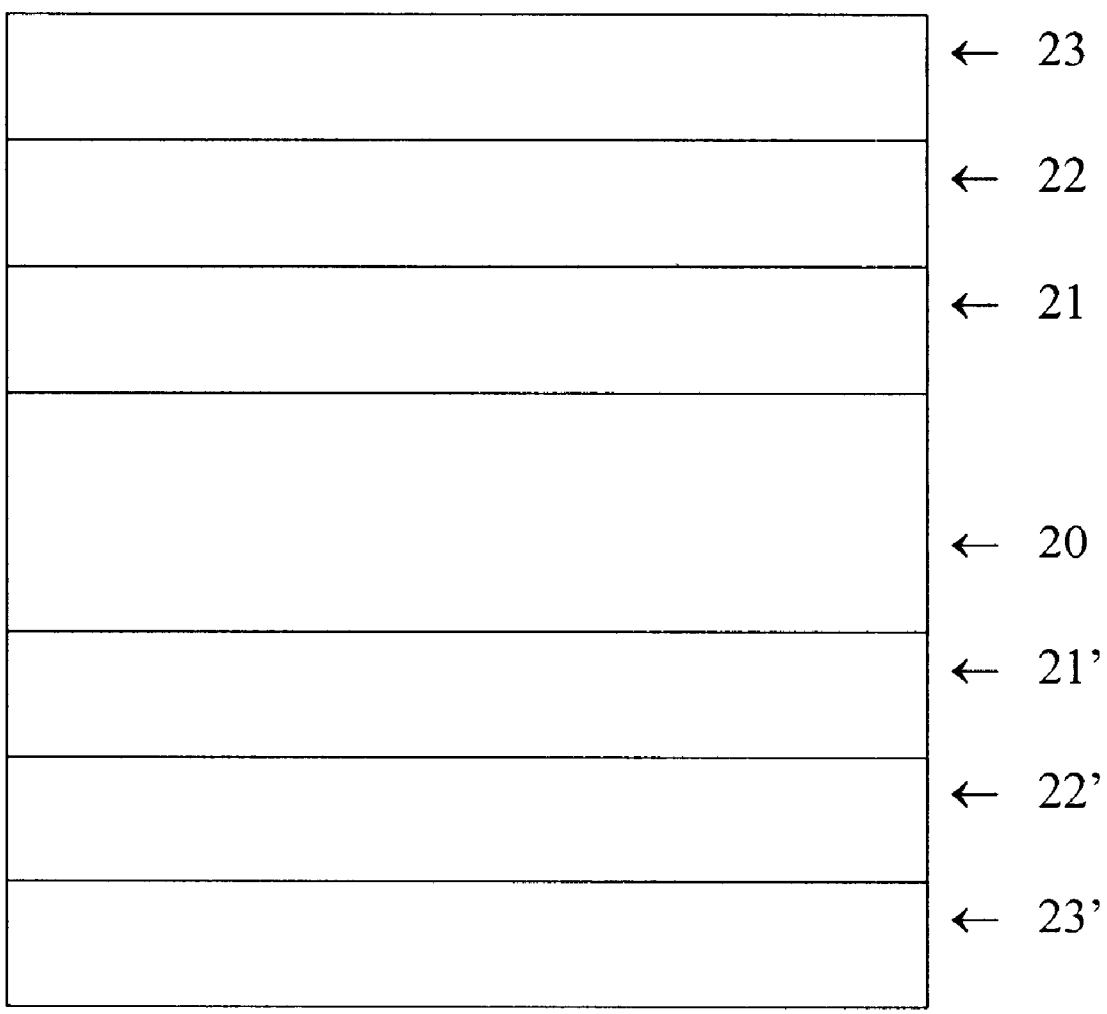
FIG. 2 schematically shows an embodiment of a magnetic recording medium of the invention.

FIG. 2 shows an embodiment of the recording medium of this invention. This embodiment comprises a non-magnetic substrate 20 having sequentially deposited on each side thereof a Ni—P—X plating layer 21, 21', an oxide layer 22, 22' having grains of an additive-rich-oxide dispersed within grains of Ni-rich oxide grains, a magnetic layer 23, 23', typically comprising a cobalt (Co) -base alloy, and a protective overcoat (not shown), typically containing carbon.

An "additive rich oxide grain" is a grain in which the largest constituent is an oxide of an additive which is not Ni. A "Ni-rich oxide grain" is a grain in which the largest constituent is an oxide of Ni.

In one embodiment, the nominal metallic NiP plating film composition would be 12% P and 88% Ni and that element "X" would typically be in the range of 0.1%–1.0% of the Ni content. Thus, an example of the metallic composition of the Ni—P—X layer would be 12% P, 87.5% Ni and 0.5% X.

In other embodiments, the X could vary in the ranges 0.1–1%, more preferably, 0.3–0.7%, Ni could vary in the ranges 80–95%, more preferably, 85–90%, and the balance being P in the Ni—P—X plating layer. The amount of X to Ni in the oxide layer 22, 22' on the Ni—P—X plating layer 21, 21' of FIG. 2 would be in proportion the amount X an Ni in the Ni—P—X plating layer.

Figure 3:
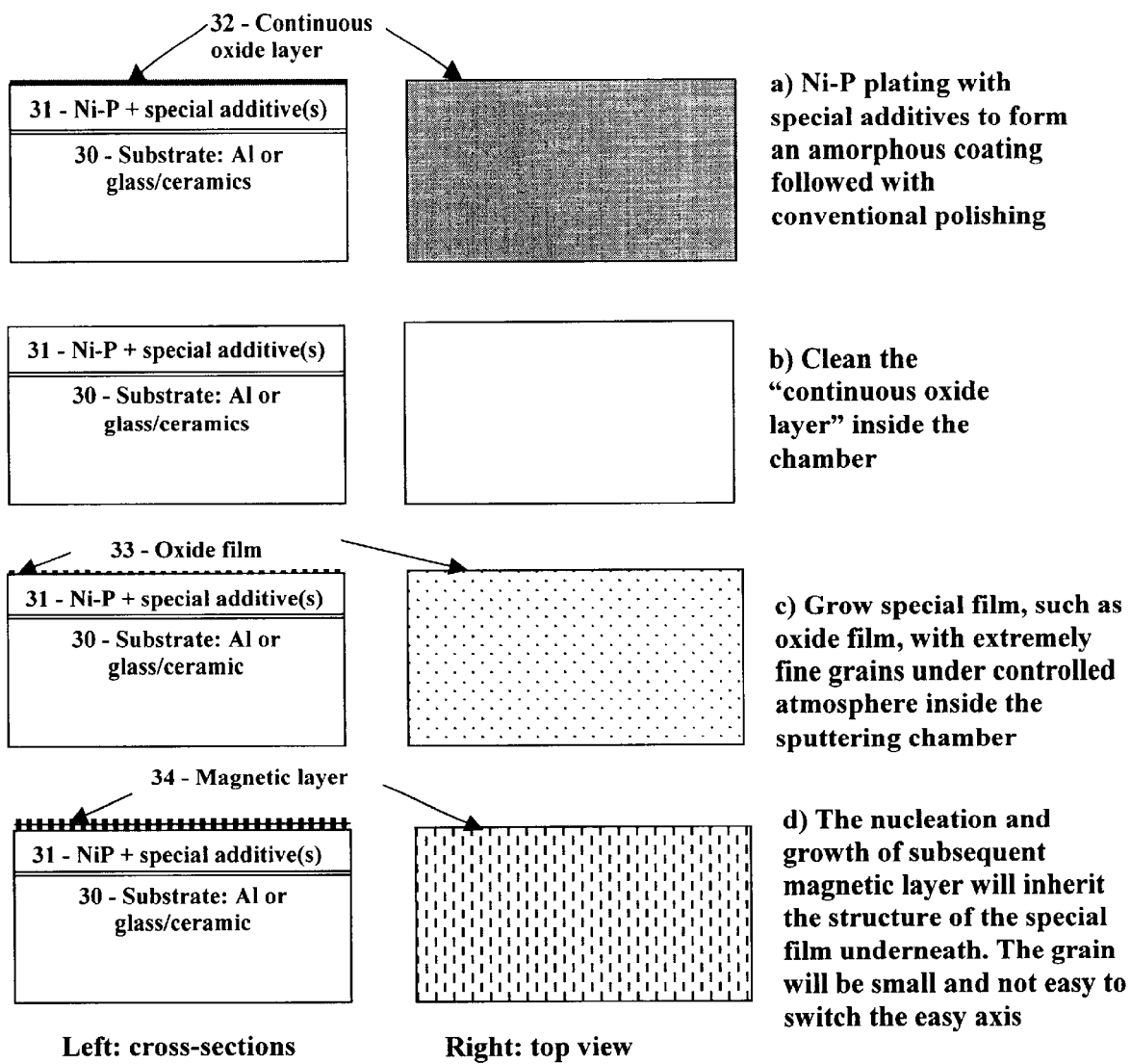
FIG. 3 schematically shows an embodiment of the method of making a magnetic recording medium of the invention.

FIG. 3 describes an embodiment of the process of this invention. In step a), a substrate 30 is plated with plated by sputter or vacuum deposition or any other technique with an amorphous Ni—P—X plating layer 31. The Ni—P—X plating layer 31 is then polished using conventional polishing methods or variations. The polishing methods and the polishing means that can employed are any one or more of the methods stated below.

Mechanical Polishing

Persons skilled in this art would recognize that the variables that control mechanical polishing are:

(1) substrate surface initial condition: roughness, waviness, substrate size, substrate shape and grain size;
(2) polishing slurry size($Al_2O_3$, $CeO_2$, $SiO_2$, etc) and coolant (inorganic and organic solutions with lubricant);
(3) polishing time and surface finishing; and
(4) washing and cleaning substrate surface Chemical Polishing Persons skilled in this art would recognize that the variables that control chemical polishing are:

(1) substrate surface initial condition: roughness, waviness, substrate size, substrate shape and grain size;
(2) polishing solutions compositions and their ability to dissolve the substrate materials;
(3) the composition consists of a combination of different acids (e.g. nitric, sulfuric, hydrochloric, phosphoric, chromic, acetic) or organic solutions (e.g. methanol, glycerin, ethyldiglicol), also containing some added electropositive ions. E.g., polishing of Al: small amounts of Cu will create additional local cathodes by deposition on Al, stimulating the polishing process. Adding some oxidants has a function as depolarization agents.

Electrochemical Polishing

Persons skilled in this art would recognize that the variables that control electrochemical polishing are:

(1) The external source of electricity to produce the anodic current density and voltage;
(2) the electrolyte temperature;
(3) the time duration of electropolishing;
(4) the cathodic materials; in general, the cathode surface should be many times larger than that of electropolished substrate. Different materials are used as cathodes depending on the applied electrolyte; and
(5) agitation, which can eliminates the undesired concentration of the dissolved material at the substrate. Agitation can improve the supply of fresh electropolishing electrolyte to substrate surface. Agitation can prevent local heating and release gas bubbles from the polished surface to avoid pitting on the substrate surface CMP (Chemical Mechanical Polishing) used in semiconductor wafer polishing. Persons skilled in this art would recognize that the variables that control the CMP process.

A continuous oxide layer 32 is generally formed-on the Ni—P—X layer 31 after polishing by the oxidation of the atmosphere. In step b) the continuous oxide 32 is removed in a sputter chamber by etching process with Ar. Subsequently, in step c) an oxide film 33 comprising fine grains of an additive-rich oxide are grown under a controlled Oxygen-containing atmosphere inside the sputter chamber.

Finally, a magnetic layer 34 is formed by sputter or vacuum deposition or any other technique on the oxide film 33. The nucleation and growth of the magnetic layer 34 will inherit the structure of the oxide film 33 underneath. The grain size of the magnetic layer 34 will be small, but having substantially uniform size. The grains of the magnetic layer are preferably segregated Co-containing grains.

In addition, the process could comprise depositing by sputter or vacuum deposition or any other technique an underlayer comprising at least one layer of Cr or Cr-based alloy and depositing by sputter or vacuum deposition or any other technique an optional intermediate layer comprising a CoCr-based alloy between the Ni—P—X containing layer and the magnetic layer. The underlayer could be a CrMo underlayer comprising 5 to 25 atomic percent molybdenum.

An embodiment of this invention includes depositing a thin intermediate magnetic layer on the underlayer and depositing the magnetic layer on the intermediate layer. The intermediate layer comprises a CoCrTa layer, which can comprise about 10 to about 40 atomic percent Cr and about 0 to about 6 atomic percent Ta. Embodiments of this invention include the use of any of the various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer.

The phrase "means for nucleating the grains of the magnetic layer on the substrate" could be the oxide film 33, which is also referred to as a "special film" in FIG. 3.

Embodiments of the substrate include any substrate made of a glass or glass-ceramic, Al, metal alloys, plastic/polymer material, ceramic, glass-polymer, composite materials or other non-magnetic materials.

In one embodiment, the magnetic medium could have a coercivity of more than 2000 Oe, more preferably more than 3000 Oe, and most preferably more than 4000 Oe. The media could have a coercivity of 5000 Oe or more.

The magnetic layer could have a thickness of about 50 Å to about 300 Å, more preferably about 100 Å to about 250 Å, most preferably about 150 Å to about 200 Å. The oxide layer could have a thickness of about 5 Å to about 100 Å, more preferably about 10 Å to about 50 Å, most preferably about 5 Å to about 25 Å. In one embodiment, the platted NiP—X layer could have a thickness of about 10–20 micron. The NiP—X layer could advantageously be sputter deposited at a total thickness of about 20 Å to about 2000 Å, such as about 50 Å to about 500 Å, preferably about 100 Å to about 200 Å.

In a preferred embodiment, the thickness of the underlayer is 20 Å to about 500 Å, preferably between 35 Å and 250 Å, and most preferably about 75 Å. In a preferred embodiment, the thickness of the intermediate layer is 5 Å to about 120 Å, preferably between 35 Å and 100 Å, and most preferably about 80 Å. In a preferred embodiment, the thickness of the protective overcoat is 20 Å to about 300 Å, preferably between 30 Å and 100 Å, and most preferably about 50 Å. The protective overcoat is made of hydrogenated carbon ($CH_x$).

The NiP—X layer could be sputter deposited employing a target containing at least about 0.5 at. % of the additive, more at 1 east about 1 at. % of the additive and most preferably about 2 at. % of the additive. Ranges of Ni and P are 75%–99%, 80%–95%, 84%–92% and 87%–89% for Nickel, and 1%–25%, 5%–20%, 8%–16% and 11%–12.5% for Phosphorus. Optionally, the plating layer may include one or more elements such as W and Pd.

The oxide layer has more than 2 at. % oxygen in the oxide layer. In a preferred embodiment, the oxide layer has more than 5 at. % oxygen in the oxide layer. The surface of the plating layer itself could be oxidized.

Advantageously, the present invention could be conducted by sputter depositing the Ni—P—X seedlayer layer, the oxide layer, the magnetic layer and a protective overcoat in an in-line pass-by or single disk apparatus comprising a plurality of sequentially spaced sputtering chambers. All samples could be fabricated with direct current (DC) magnetron sputtering except carbon films, which were made by either DC magnetron sputtering, ion-beam deposition or chemical-vapor deposition (CVD).

EXAMPLE

The Ni—P—X plated substrate, Wherein X is selected from the group consisting of Al, Co, Cr, Fe, Ti, V, Cd, Zr, Mn and Mo, is prepared in the following way. The substrate is prepared by a series of conventional steps known as the pre-plate or pre-treatment. This series is comprised of solutions for cleaning, etching, zincating and stripping. Several rinses are incorporated within the sequence to avoid cross-contamination. Upon completion of the last rinse, the substrate, which is made of glass, glass ceramic or Al, is ready to receive deposition from an electroless Ni—P bath, which has been modified to Ni—P—X, wherein X is selected from the group consisting of the fore mentioned elements. Modification of the bath is accomplished whereby X is directly added to the initial bath constituents and subsequently metered into the bath at a varied concentration during the plating of the substrate and for the entirety of the plating bath.

The deposition of subsequent layers on the Ni—P—X plated substrate is done as follows. The substrate is first cleaned using detergent containing de-ionized water to remove particles from its surface. The substrate is then loaded inside the sputter machine. Once inside, the already oxidized substrate surface is cleaned using the etching process with Ar gas. The etching process will remove all the oxide film and therefore expose the fresh Ni—P—X layer. Then a controlled gas flow of Ar+O2 is injected into the vacuum chamber. The % of the O2 gas can be varied from 1% to 50%. Due to the high oxidation potential of the X-additive, segregated oxide islands are formed. The typical size of these oxide islands is 1 nm to 10 nm in diameter. After growing the segregated oxide film, the substrate is heated to a temperature of 150 to 250° C., followed by growing the underlayer of Cr or Cr-based alloy, intermediate layer of CoCr-based alloy, and magnetic layer of Co-based alloy. A protection layer of carbon is then deposited on top of the magnetic layer.

Only certain embodiments of the present invention and but a few examples of its versatility are shown and described in the present disclosure.

It is to be understood that the present invention is capable of use in various other combinations and in environments, and is capable of changes and modifications within the scope of the inventive concept as expressed herein.

What is claimed is:

1. A magnetic recording medium, comprising:
    a substrate,
    a Ni—P—X containing layer on the substrate,
    a magnetic layer comprising segregated Co-containing grains on the Ni—P—X containing layer, and
    an oxide layer in between the Ni—P—X containing layer and the magnetic layer,
    wherein X is an additive and has a higher oxidation potential than that of Ni and X is not W, and the oxide layer comprises additive-rich-oxide grains and Ni-rich oxide grains.

2. A magnetic recording medium according to claim 1, wherein X is selected from the group consisting of Al, Co, Cr, Fe, Ti, V, Cd, Zr, Mn and Mo.

3. The magnetic recording medium according to claim 1, further comprising:
    an underlayer comprising at least one layer of Cr or Cr-based alloy on the Ni—P—X containing layer and
    an optional intermediate layer comprising a CoCr-based alloy on the underlayer.

4. The magnetic recording medium according to claim 1, wherein the segregated Co-containing grains have a mean grain diameter of about 100 Å or less.

5. The magnetic recording medium according to claim 1, wherein the additive-rich-oxide grains have a spacing between adjacent additive-rich-oxide grains of about 100 Å or less.

6. The magnetic recording medium according to claim 1, wherein the oxide layer has a thickness of about 5 to 100 Å.

7. The magnetic recording medium according to claim 1, wherein the magnetic layer has a thickness of about 100 to 300 Å.

8. The magnetic recording medium according to claim 3, wherein the substrate is a glass substrate or an aluminum substrate, the underlayer is CrW, CrV, CrTi or CrTa and the intermediate layer is CoCr, CoCrPt, CoCrPtTa or CoCrPtB.

9. A method of manufacturing a magnetic recording medium, the method comprising:
    depositing a Ni—P—X containing layer on a substrate,
    depositing an oxide layer on the Ni—P—X containing layer and
    depositing a magnetic layer comprising segregated Co-containing grains on the Ni—P—X containing layer,
    wherein X is an additive and has a higher oxidation potential than that of Ni and X is not W, and the oxide layer comprises additive-rich-oxide grains and Ni-rich oxide grains.

10. The method of claim 9, wherein X is selected from the group consisting of Al, Co, Cr, Fe, Ti, V, Cd, Zr, Mn and Mo.

11. The method of claim 9, wherein the segregated Co-containing grains have a mean grain diameter of about 100 Å or less.

12. The method of claim 9, further comprising:
    cleaning the Ni—P—X layer;
    depositing an underlayer comprising at least one layer of Cr or Cr-based alloy on the oxide layer and
    depositing an optional intermediate layer comprising a CoCr-based alloy on the underlayer.

13. The method of claim 9, wherein the additive-rich-oxide grains have a spacing between adjacent additive-rich-oxide grains of about 100 Å or less.

14. The method of claim 9, wherein the oxide layer has a thickness of about 5–100 Å.

15. The method of claim 9, wherein the magnetic layer has a thickness of about 100–300 Å.

* * * * *